United States Patent
Wang

(10) Patent No.: US 8,448,535 B2
(45) Date of Patent: May 28, 2013

(54) MULTIPLE-ANGLE TRANSMISSION APPARATUS

(76) Inventor: Ching-Yi Wang, Taichung (TW)

( * ) Notice: Subject to any disclaimer, the term of this patent is extended or adjusted under 35 U.S.C. 154(b) by 238 days.

(21) Appl. No.: 13/089,405

(22) Filed: Apr. 19, 2011

(65) Prior Publication Data

US 2012/0266709 A1 Oct. 25, 2012

(51) Int. Cl.
*F16H 1/14* (2006.01)

(52) U.S. Cl.
USPC .............................................. 74/417; 30/500

(58) Field of Classification Search
USPC ....................... 74/417, 416, 395, 431; 30/500
See application file for complete search history.

(56) References Cited

U.S. PATENT DOCUMENTS

| | | | | |
|---|---|---|---|---|
| 3,724,561 A | * | 4/1973 | Merrels | 173/50 |
| 3,808,904 A | * | 5/1974 | Gotsch et al. | 74/343 |
| 4,487,272 A | * | 12/1984 | Bleicher et al. | 173/48 |
| 4,924,578 A | * | 5/1990 | Chagnon et al. | 30/500 |
| 5,743,670 A | * | 4/1998 | Ader | 403/296 |
| 5,865,499 A | * | 2/1999 | Keyser | 296/173 |
| 6,264,211 B1 | * | 7/2001 | Granado | 279/143 |
| 7,191,677 B2 | * | 3/2007 | Barkdoll | 74/396 |
| 8,240,055 B2 | * | 8/2012 | Gooding | 30/276 |

\* cited by examiner

*Primary Examiner* — David M Fenstermacher
(74) *Attorney, Agent, or Firm* — Che-Yang Chen; Law Office of Michael Chen

(57) ABSTRACT

A multiple-angle transmission tool includes a first shell, a transmission stick, a first gear, a second shell, a connecting unit, a second gear, a transmission unit and a screw bolt, wherein each the first shell and the second shell has a connecting surface that has a number of recessed portions arranged in a circular manner, and each recessed portion is spaced with a protruding portion to form a restricted position to engage. Also, the first gear, the second gear and the transmission unit are located in a receiving space formed within the first shell and the second shell. When the first shell and the second shell move along the entire circumference, the momentum can be transmitted and changed when the first shell, the second shell and the transmission unit are engaged.

7 Claims, 6 Drawing Sheets

MULTIPLE-ANGLE TRANSMISSION APPARATUS

FIELD OF THE INVENTION

The present invention is related to a multiple-angle transmission tool, and more specifically to a transmission tool that can randomly change and adjust angle when fastening a screw.

BACKGROUND OF THE INVENTION

When a user uses an electricity-air driven tool, a tool head of the tool is usually fixed and cannot be adjusted according to the position of the screw that is being fastened, which may cause some inconvenience for the user. Furthermore, it may be difficult for the user to find the angle to fasten the screw when the user wants to use the tool in a narrow or limited space.

Therefore, there remains a need for a new and improved transmission tool that can randomly change and adjust the angle when fastening the screw to overcome the abovementioned issues or problems.

SUMMARY OF THE INVENTION

The technical problem to be solved in the present invention is that a conventional tool head of an electricity-air driven tool is usually fixed and the angle for fastening a screw cannot be changed as desired, so that the tool can merely fasten the screw along a parallel angle.

The technical point to solve the problem mentioned above is that the present invention provides a multiple-angle transmission tool including: a first shell, a transmission stick, a first gear, a second shell, a connecting unit, a second gear, a transmission unit and a screw bolt, wherein the first shell is curved and one side thereof forms a connecting surface which has a number of recessed portions arranged in a circular manner, and each recessed portion is spaced with a protruding portion to form a restricted position to engage. Also, an inner portion of the first shell forms a receiving space and the transmission stick that is coupled with a screw and a bearing to secure a position penetrates the receiving space. One end of the transmission stick is extending and the other end is engaged with the first gear in the receiving space, wherein the first gear has an umbrella-shaped tooth portion to transmit the momentum and change the direction thereof. The second shell is curved and one side thereof forms a connecting surface which has a number of second recessed portions arranged in a circular manner, and each second recessed portion is spaced with a second protruding portion to form a restricted position to engage. Also, an inner portion of the first shell forms a second receiving space and the connecting unit has a second transmission stick that is coupled with a second screw and a second bearing to secure a position penetrates the receiving space. One end of the second transmission stick is extending and the other end is engaged with the second gear in the receiving space, wherein the extending end of the transmission stick has a polygonal connecting hole, outside of which has a sliding unit against a resilient unit. The sliding unit is connected with a positioning unit on the second transmission stick, so that the positioning unit can be protruding out from the connecting hole under normal condition, and when the sliding unit is horizontally moved, the positioning unit is pulled back. The second gear has a second umbrella-shaped tooth portion to transmit the momentum and change the direction thereof, and the transmission unit has a third tooth portion symmetrically located at both ends of the transmission unit, and a through hole is formed at a center of the transmission unit.

Comparing with conventional techniques, when the multiple-angle transmission in the present invention is in use, the screw bolt can be loosened so that the first shell and the second shell can fully move and rotate to adjust different screw angles and avoid dead angles. Also, it is suitable for a narrow or limited space. When the screw bolt is tightened again, the recessed portion and the second recessed portion can be engaged with the protruding portion and the second protruding portion of the first shell and the second shell respectively, to avoid the angle change after adjustment.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
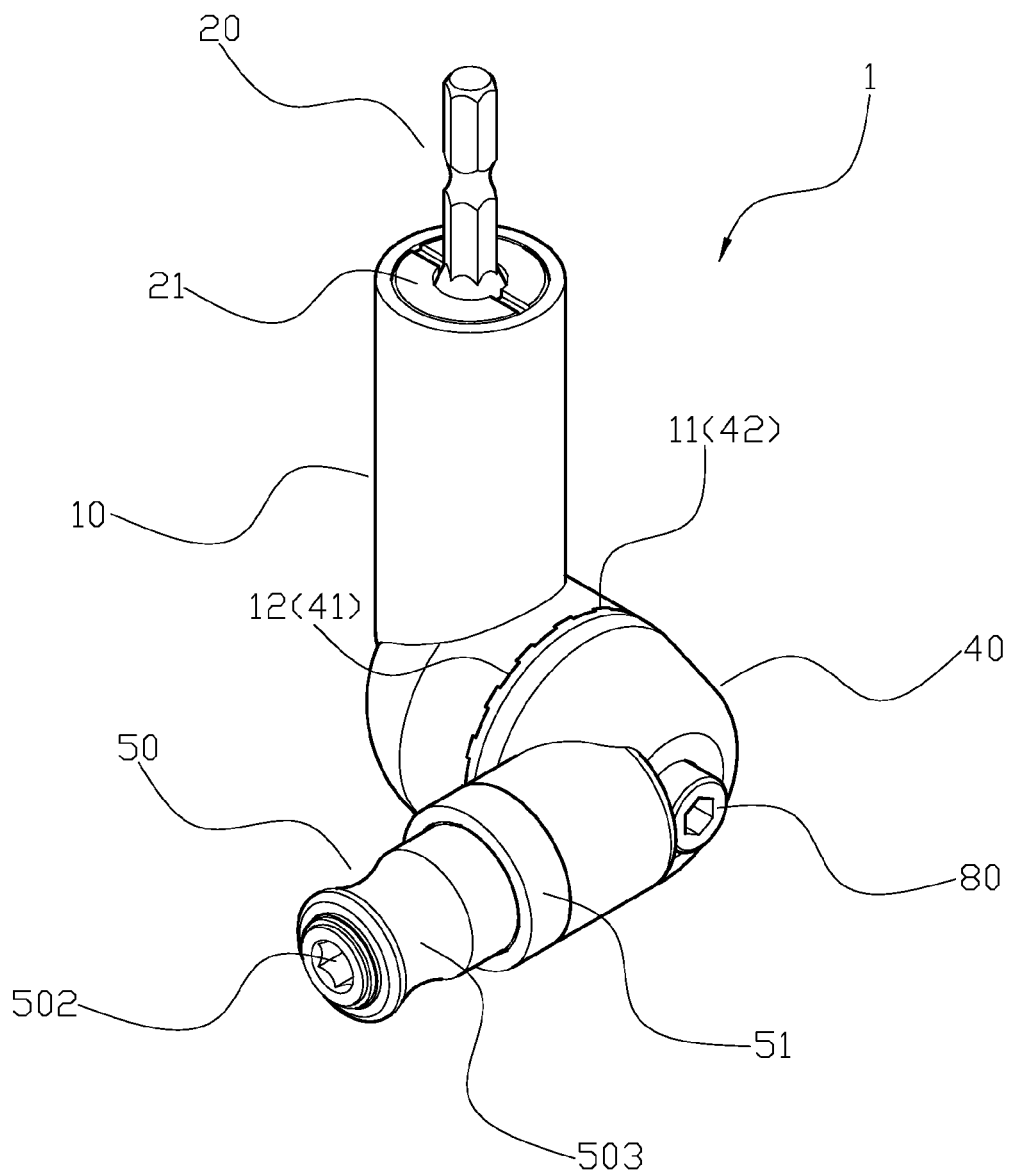
FIG. 1 illustrates a three-dimensional assembled view in the present invention.
Figure 2:
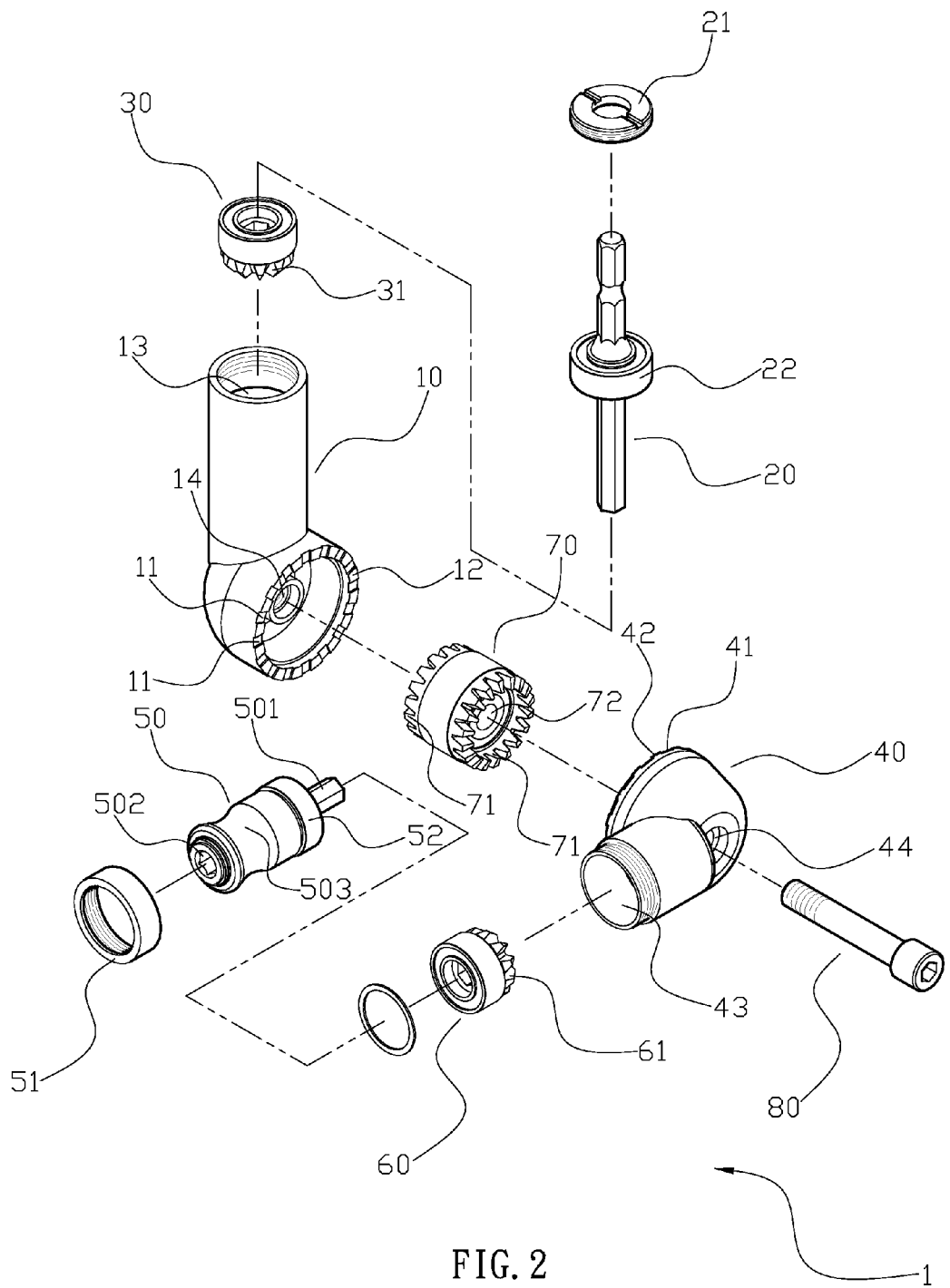
FIG. 2 illustrates a three-dimensional exploded view in the present invention.

In order to further understand the goal, characteristics and effect of the present invention, a number of embodiments along with the drawings are illustrated as following:

Referring to FIGS. 1 to 2, the present invention provides a multiple-angle transmission tool (1), the transmission tool (1) includes a first shell (10), a transmission stick (20), a first gear (30), a second shell (40), a connecting unit (50), a second gear (60), a transmission unit (70) and a screw bolt (80), wherein the first shell is curved and one side thereof forms a connecting surface which has a number of recessed portions (11) arranged in a circular manner, and each recessed portion (11) is spaced with a protruding portion (12) to form a restricted position. Also, an inner portion of the first shell (10) forms a receiving space (13) and the transmission stick (20) that is coupled with a screw (21) and a bearing (22) to secure a position penetrates the receiving space (13). One end of the transmission stick (20) is extending and the other end is engaged with the first gear (30) in the receiving space (13), wherein the first gear (30) has an umbrella-shaped tooth portion (31) to transmit the momentum and change the direction thereof. The second shell (40) is curved and one side thereof forms a connecting surface which has a number of second recessed portions (41) arranged in a circular manner, and each second recessed portion (41) is spaced with a second protruding portion (42) to form a restricted position. Also, an inner portion of the first shell (40) forms a second receiving space (43) and the connecting unit 50 has a second transmission stick (501) that is coupled with a second screw 50 and a second bearing (52) to secure a position penetrates the receiving space (43). One end of the second transmission stick (501) is extending and the other end is engaged with the second gear (60) in the receiving space (43), wherein the extending end of the second transmission stick (501) has a polygonal connecting hole (502), outside of which has a sliding unit (503) against a resilient unit. The sliding unit (503) is connected with a positioning unit on the second transmission stick (501), so that the positioning unit can be protruding in the connecting hole (502) under normal condition, and when the sliding unit (503) is horizontally moved, the positioning unit is pulled back. The second gear (60) has a second umbrella-shaped tooth portion (61) to transmit the momentum and change the direction thereof, and the transmission unit (70) has a third tooth portion (71) symmetrically located at both ends of the transmission unit (70), and a through hole (72) is formed at a center of the transmission unit (70).

According to the structure stated above, the transmission unit (70) is located at the first receiving space (13) and the second receiving space (43) formed by the engaged first shell (10) and second shell (40). Also, the third tooth portion (71) (symmetrically at both ends of the transmission unit (70)) is engaged with the first tooth portion (31) and the second tooth portion (61) of the first gear (30) and the second gear (60), respectively. Furthermore, the screw bolt (80) penetrates a through opening (44) of the second shell (40), the through hole (72) of the transmission unit (70), and tightly screws with a screw opening (14) of the first shell (10) to completely assemble the transmission tool (1).

Figure 3:
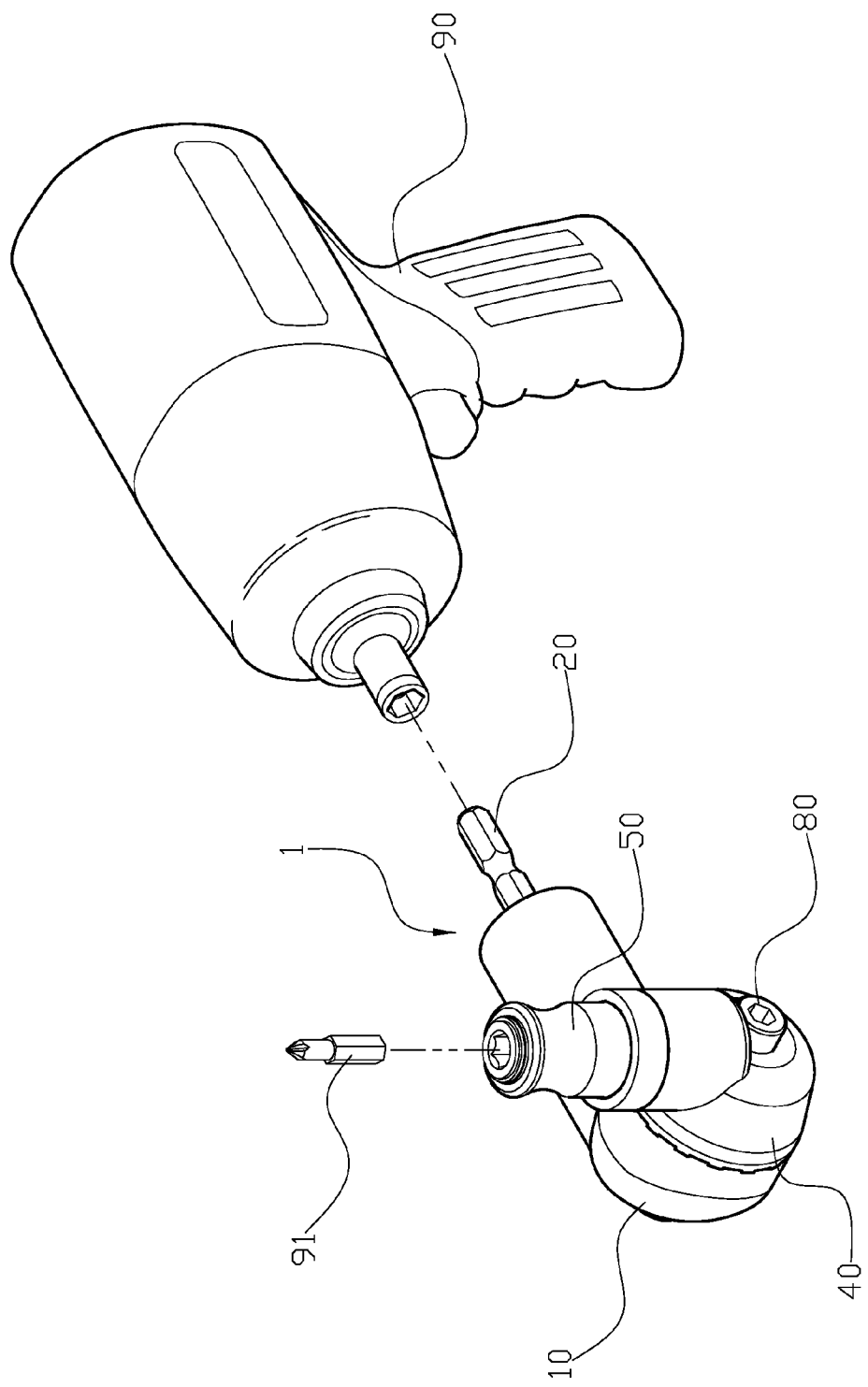
FIG. 3 illustrates a schematic view of the multiple-angle transmission tool in use in the present invention.
Figure 4:
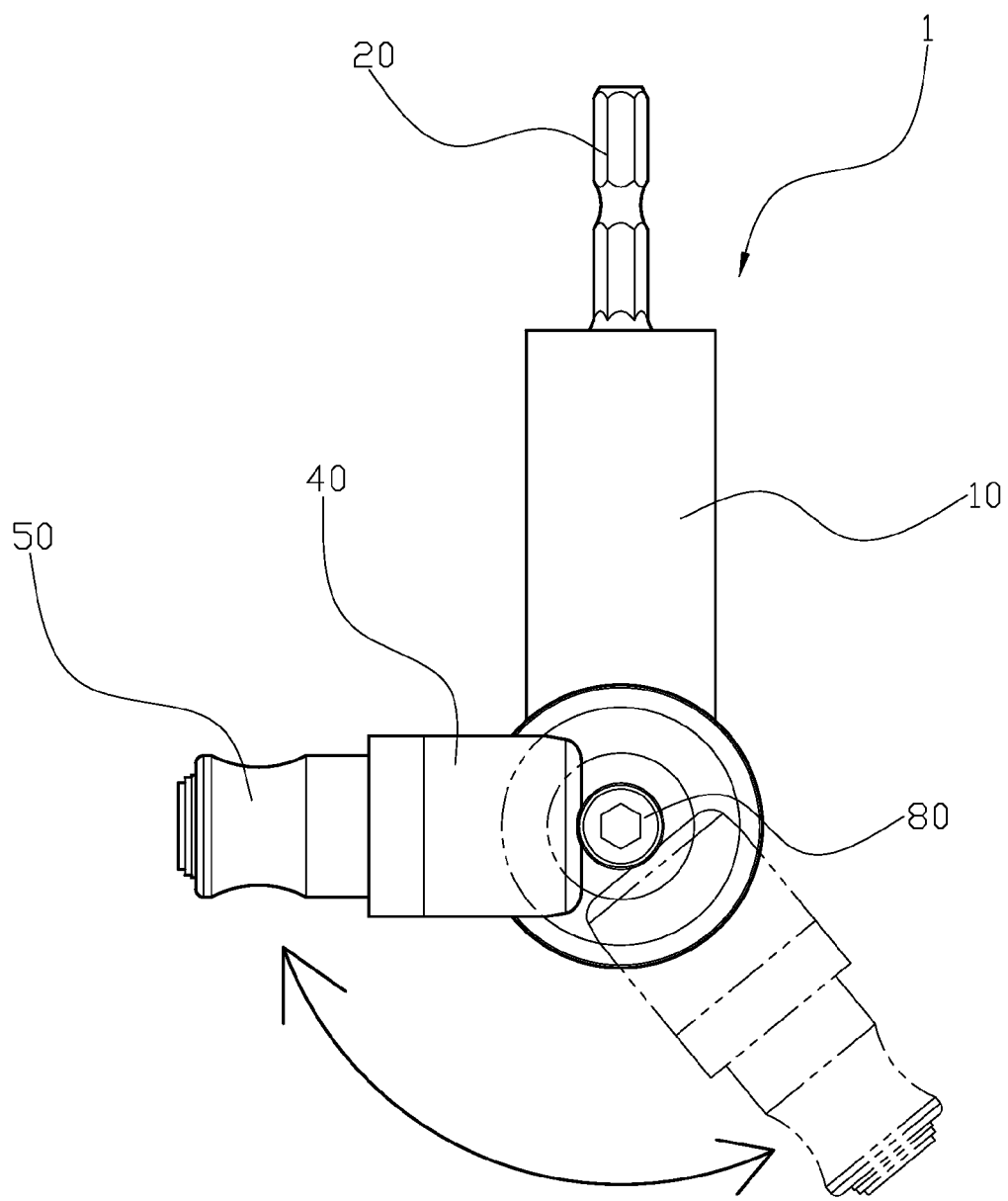
FIG. 4 illustrates a schematic view of the multiple-angle transmission tool that can freely rotate in the present invention.
Figure 5:
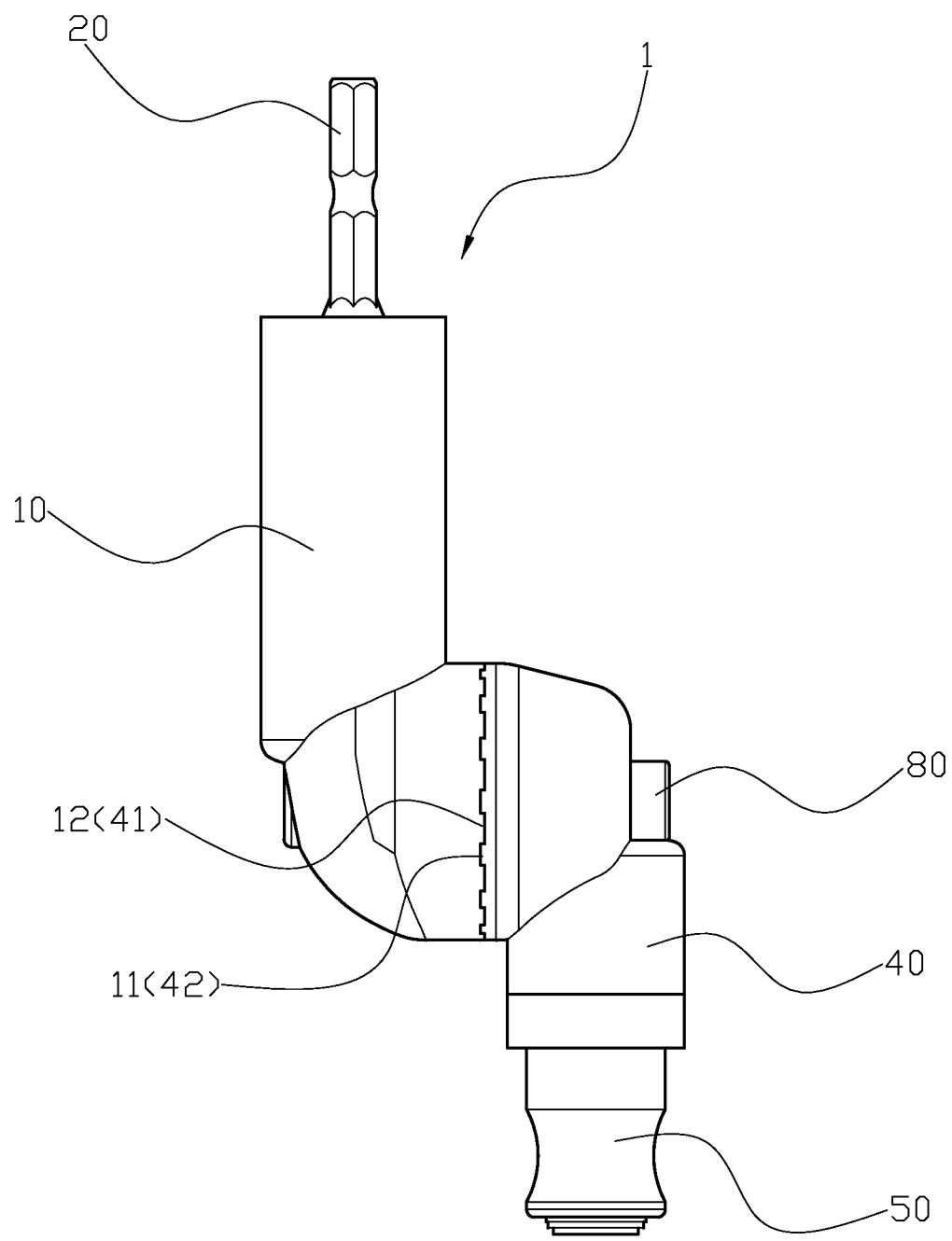
FIG. 5 is a schematic view of the multiple-angle transmission tool after rotation in the present invention.
Figure 6:
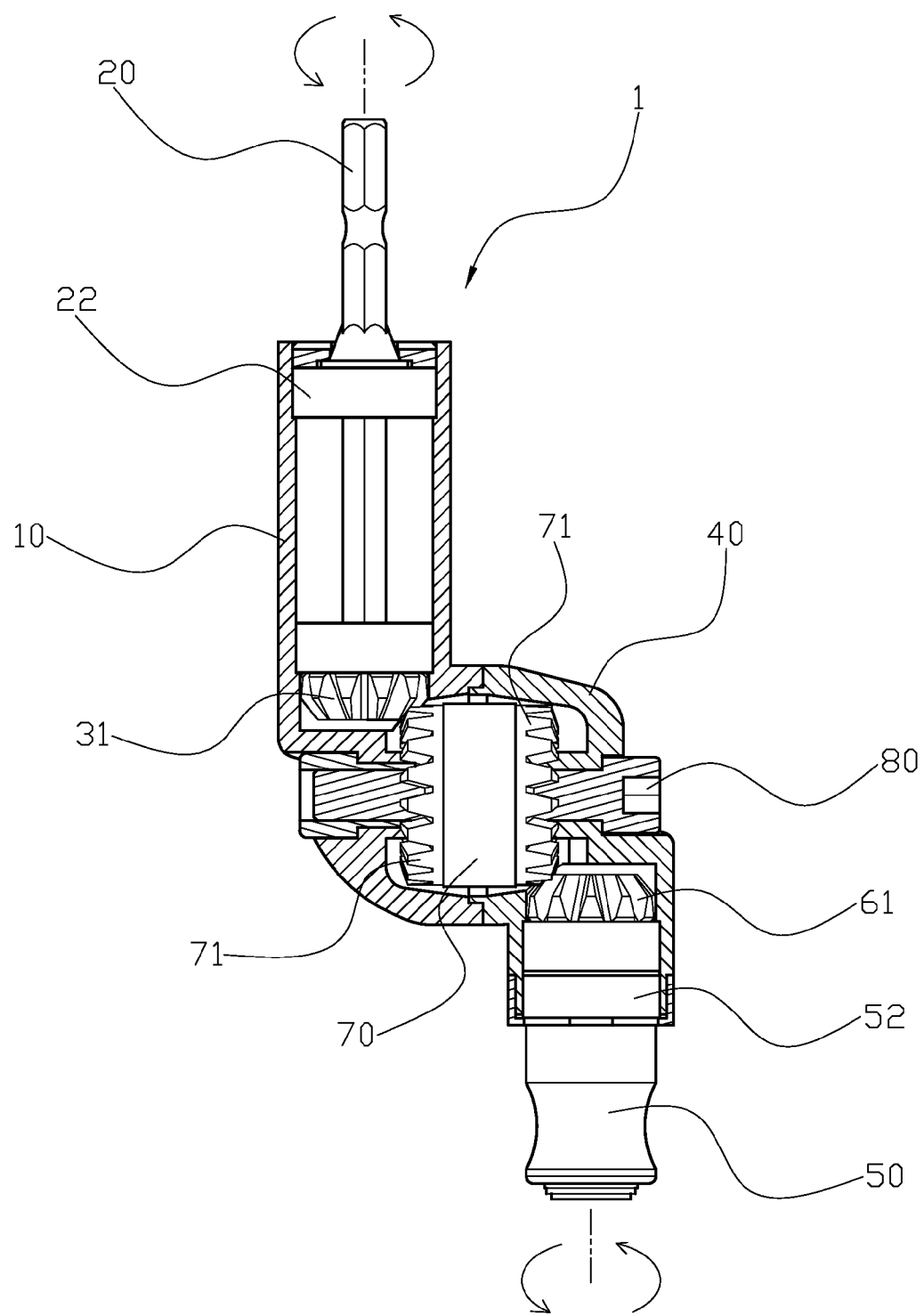
FIG. 6 is a schematic view of momentum transmission in the present invention.

Referring to FIG. 3, when the tool is in use, the transmission stick (20) is connected with an electricity-air driven tool (90), and a tool head (91) is plugged in and secured by the connecting hole (502) of the connecting unit (50) coupled with the sliding unit (503) and the positioning unit, and the first gear (30), the second gear (60) and the transmission unit (70) are operated in coordination in the transmission tool (1), so that the tool head (91) can be driven to fasten a screw (see FIG. 6) by the electricity-air driven tool (90). Furthermore, it can also loosen the screw bolt (80), so that the first shell (10) and the second shell (40) can fully move and rotate (see FIGS. 4 and 5) to adjust different screw angles and avoid dead angles. Also, it is suitable for a narrow or limited space. When the screw bolt (80) is tightened again, the recessed portion (11) and the second recessed portion (41) can be engaged with the protruding portion (12) and the second protruding portion (42) of the first shell (10) and the second shell (40) respectively, to avoid the angle change after adjustment.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A multiple-angle transmission apparatus, comprising a first shell, a transmission stick, a first gear, a second shell, a connecting unit, a second gear, a transmission unit and a screw bolt,
    wherein one side the first shell forms a connecting surface which has a number of recessed portions arranged in a circular manner, and each recessed portion is spaced with a protruding portion to form a restricted position to engage, and an inner portion of the first shell forms a receiving space,
    wherein one end of the transmission stick is extending and the other end is engaged with the first gear in the receiving space, and the first gear has an umbrella-shaped tooth portion to transmit the momentum and change the direction thereof,
    wherein one side of the second shell forms a connecting surface which has a number of second recessed portions arranged in a circular manner, and each second recessed portion is spaced with a second protruding portion to form a restricted position to engage, and an inner portion of the first shell forms a second receiving space,
    wherein the connecting unit has a second transmission stick that is coupled with a second screw and a second bearing to secure a position penetrates the receiving space, and one end of the second transmission stick is extending and the other end is engaged with the second gear in the receiving space,
    wherein the extending end of the second transmission stick has a polygonal connecting hole, and the second gear has a second umbrella-shaped tooth portion to transmit the momentum and change the direction thereof, and the transmission unit has a third tooth portion symmetrically located at both ends of the transmission unit, and a through hole is formed at a center of the transmission unit, and
    wherein the transmission unit is located at the first receiving space and the second receiving space formed by the engaged first shell and second shell, and the third tooth portion symmetrically at both ends of the transmission unit is engaged with the first tooth portion and the second tooth portion of the first gear and the second gear respectively, so that the first shell and the second shell is tightly secured when the screw bolt is fastened.

2. The multiple-angle transmission apparatus of claim 1, wherein the first shell is curved.

3. The multiple-angle transmission apparatus of claim 1, wherein the transmission stick is coupled with a screw and a bearing to secure a position on the first shell.

4. The multiple-angle transmission apparatus of claim 1, wherein the second shell is curved.

5. The multiple-angle transmission apparatus of claim 1, wherein the second transmission stick of the connecting unit is coupled with a second screw and a second bearing to secure a position on the second shell.

6. The multiple-angle transmission apparatus of claim 1, wherein outer circumference of the second transmission stick of the connecting unit has a sliding unit against a resilient unit, and the sliding unit is connected with a positioning unit on the second transmission stick, so that the positioning unit is protruding in the connecting hole under normal condition, and when the sliding unit is horizontally moved, the positioning unit is pulled back.

7. The multiple-angle transmission apparatus of claim 1, wherein the first shell and the second shell have a screw opening and a through opening respectively, and the screw bolt passes through the through opening of the second shell, the through hole of the transmission unit and the screw opening of the first shell to securely assemble the apparatus.

* * * * *